(12) United States Patent
Prada Silvy et al.

(10) Patent No.: US 12,195,337 B2
(45) Date of Patent: Jan. 14, 2025

(54) LONG AND NARROW DIAMETER CARBON NANOTUBES AND CATALYSTS FOR PRODUCING SAME

(71) Applicant: Chasm Advanced Materials, Inc., Canton, MA (US)

(72) Inventors: Ricardo A. Prada Silvy, Norman, OK (US); Sathish Kumar Lageshetty, Edmond, OK (US)

(73) Assignee: Chasm Advanced Materials, Inc., Canton, MA (US)

( * ) Notice: Subject to any disclaimer, the term of this patent is extended or adjusted under 35 U.S.C. 154(b) by 104 days.

(21) Appl. No.: 17/699,144

(22) Filed: Mar. 20, 2022

(65) Prior Publication Data

US 2022/0298017 A1 Sep. 22, 2022

Related U.S. Application Data

(60) Provisional application No. 63/163,389, filed on Mar. 19, 2021.

(51) Int. Cl.
*C01B 32/162* (2017.01)
*B01J 21/08* (2006.01)
*B01J 23/882* (2006.01)
*B01J 35/00* (2024.01)
*B01J 35/23* (2024.01)

(52) U.S. Cl.
CPC ............. *C01B 32/162* (2017.08); *B01J 21/08* (2013.01); *B01J 23/882* (2013.01); *B01J 35/23* (2024.01); *C01P 2004/13* (2013.01)

(58) Field of Classification Search
CPC ....... C01B 32/162; B01J 21/08; B01J 23/882; B01J 35/0013
See application file for complete search history.

(56) References Cited

U.S. PATENT DOCUMENTS

2009/0286675 A1* 11/2009 Wei ..................... C01B 32/162
502/185

OTHER PUBLICATIONS

Ebbesen et al., Nature, (1992), v358, p. 220-222.*
Lijima et al., Nature, (1993), v363, p. 603-605.*

* cited by examiner

*Primary Examiner* — Yong L Chu
(74) *Attorney, Agent, or Firm* — Brian M. Dingman; Prince Lobel Tye, LLP

(57) ABSTRACT

A bundle of carbon nanotubes (CNT), comprising a plurality of CNT with lengths of at least about 7 microns, wherein the bundle has a diameter of less than about 12 nm.

10 Claims, 14 Drawing Sheets

METALLIC COBALT
NANOCLUSTERS

SWCNT
GROWTH

SWCNT BUNDLE

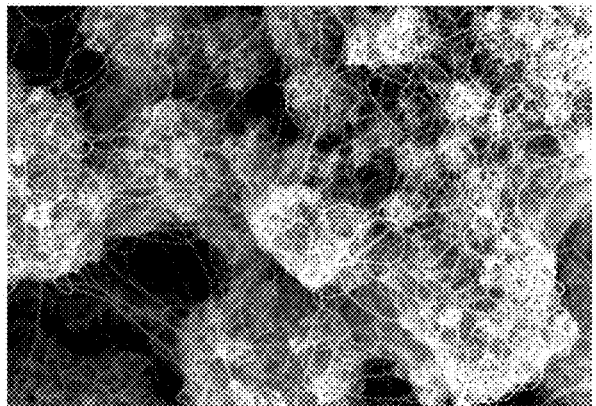
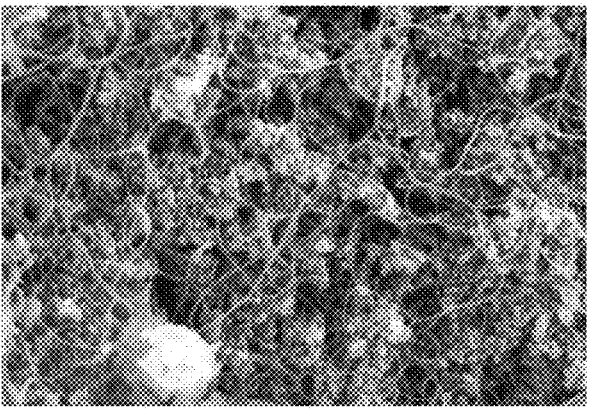
FIG. 5A  FIG. 5B
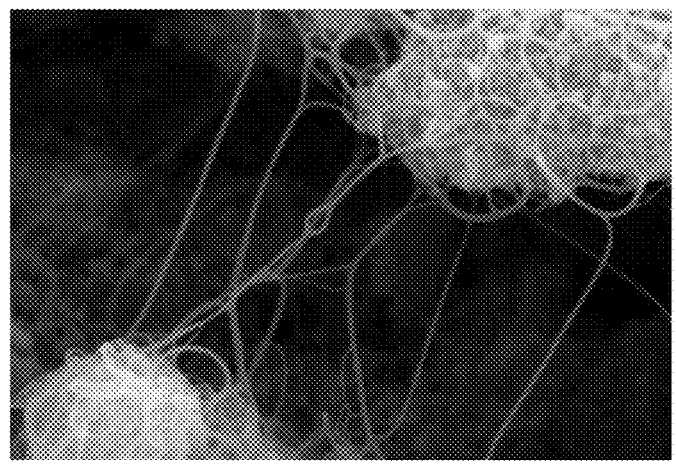
FIG. 5C

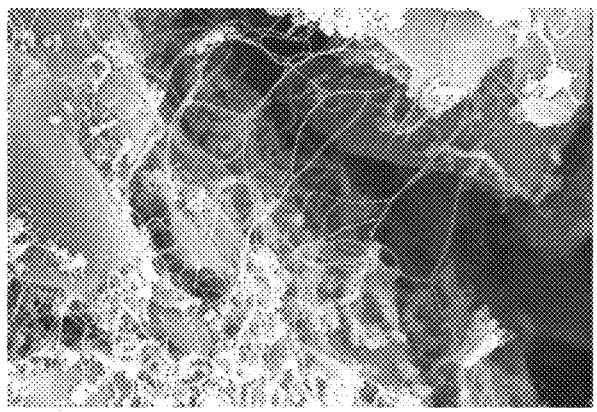 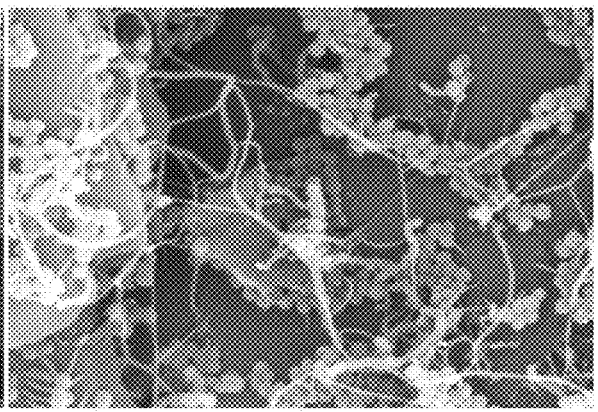
FIG. 6A          FIG. 6B
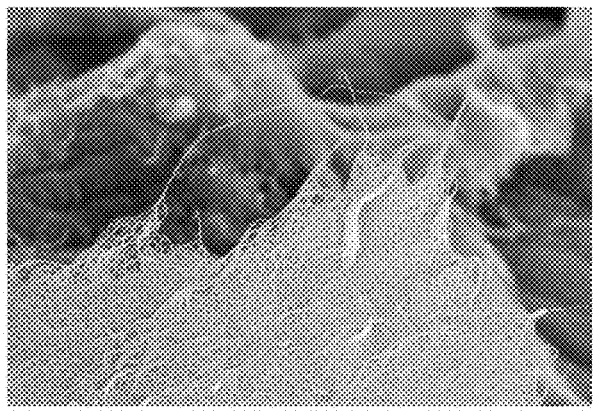 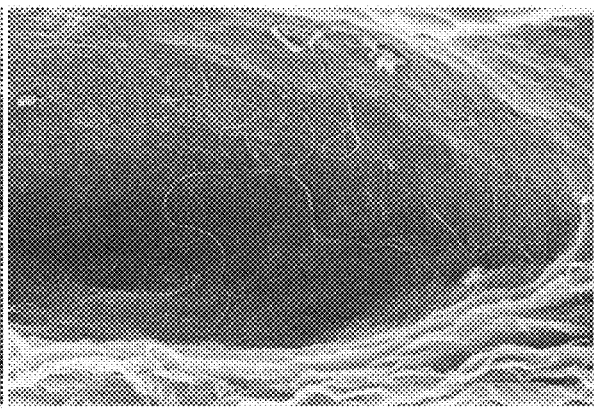
FIG. 7A          FIG. 7B

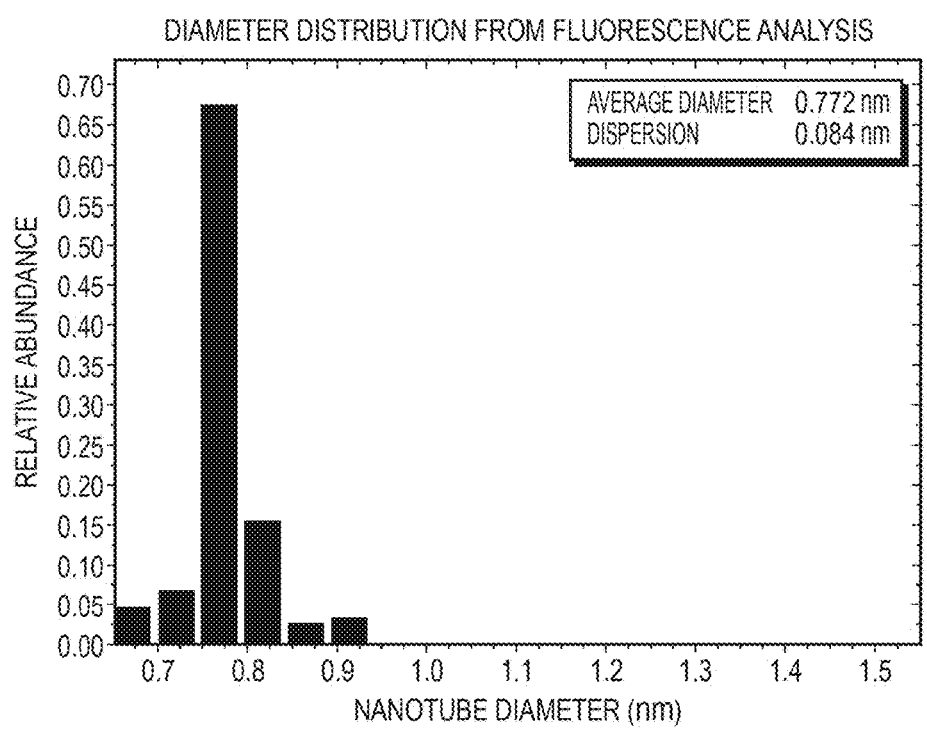
FIG. 16
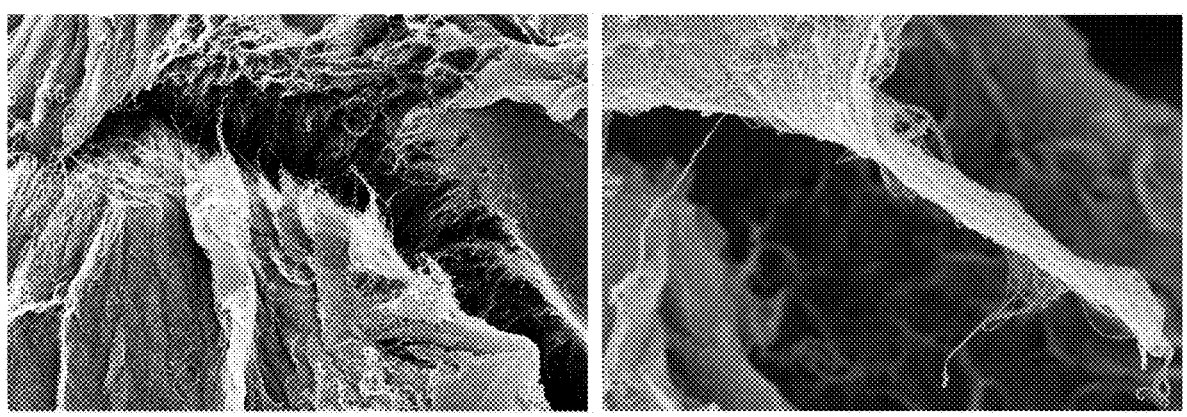
FIG. 17AFIG. 17B

LONG AND NARROW DIAMETER CARBON NANOTUBES AND CATALYSTS FOR PRODUCING SAME

CROSS-REFERENCE TO RELATED APPLICATION

This applications claims priority of Provisional Application 63/163,389 filed on Mar. 19, 2021, the entire disclosure of which is incorporated by reference herein for all purposes.

BACKGROUND

This disclosure relates to long, narrow carbon nanotubes (CNTs).

There are a large number of commercial applications that take full advantage of carbon nanotubes (CNTs) material properties due to their excellent structural (tubular carbon having nanometric diameter sizes), physicochemical, optical, electrical and thermal conductivity and mechanical properties. Carbon nanotube nanocomposite-based membranes have been demonstrated to efficiently separate mineral salts from seawater, and a variety of toxic chemical substances and biological microorganism from water. These membranes have demonstrated a variety of advantages versus polymeric membranes that include: improved water permeability, high selectivity, fouling resistance, less energy consumption, resistance to harsh environmental conditions, high durability, and cost-effectiveness. However, their applications at industrial scale are still limited by high cost due to the method of synthesis employed (laser ablation, arc discharge, floating catalyst—aerosol assisted CCVD) and their capacity. The control of CNT length and bundle diameter, CNT inner diameter distribution, and CNT impurity levels are important, as these parameters significantly impact the efficiency of separation accomplished with the CNT-based membranes.

In the preparation of heterogeneous catalysts for the production of carbon nanotubes, the type and distribution of the supported metal oxides, the size of active metals nanoparticles (which determines the diameter of the nanotubes), and the surface dispersion of the active metal nanoparticles are controlled variables. In a CoMo/$SiO_2$ catalyst, the cobalt atoms are distributed in different phases. For instance, forming a mixed phase with molybdenum ($CoMoO_4$), surface cobalt oxide ($Co_3O_4$) crystallites and associated with silica ($CoSiO_2$). The distribution of these phases depends at least on the total Co and Mo content, the Mo/Co atomic ratio, the type and surface properties of silica support, and the temperature and time of calcination. In the prior art, the metal content in the CoMo/$SiO_2$ catalysts for producing SWCNTs is higher than 0.2 wt % and the Mo/Co ratio varies in the 1 to 3 range. In the prior art catalysts, the Co is typically present at greater than 0.3 weight percent and the Mo is typically present at greater than 0.5 percent, which also typically creates a Co/Mo atomic ratio of greater than 1. When the catalyst is calcined at temperatures above 500° C. for a long period of time, a solid-state reaction takes place between the surface $Co_3O_4$ phase and the silica support to form $CoSiO_2$ species. These species are inactive for SWCNT production, and so very high reduction temperatures (>800° C.) are used to migrate the species to the surface to form metallic cobalt aggregates that are the active species in the SWCNT production. However, there is a critical metallic cluster size to form SWCNTs whose value, according to the literature, is about 0.5 nm. High Co and Mo contents in the catalyst produce the following simultaneous effects: i) lower surface metallic dispersion due to the aggregation of $Co_3O_4$ and $CoMoO_4$ crystallites, ii) non-homogeneous diameter distribution of the SWCNTs, which will make the membrane less selective for the separation or removing impurities from water, and iii) formation of a dense carpet of entangled SWCNTs covering the support particles that affect the rates of growth and termination of the CNTs due to heat and mass transfer limitations.

An aspect to consider in the development of catalysts for the synthesis of long and straight CNTs (e.g., long SWCNT and small tube or bundle diameter, such as CNT tubes or bundles with a length to diameter aspect ratio of greater than about 10,000) is the morphological properties of the support which orient the carbon tubes in a given direction during their growth. Some specific examples of these supports are: i) solids with a sponge-like structure, as is the case of high surface area MgO support prepared by combustion or fume methods, ii) zeolites or molecular sieve supports that have well controlled pore diameter and specific crystalline structure, and iii) solids having lamellar structures such as micas, vermiculites, and pillar clays, where the CNTs growth is controlled by the orientation and space of the sheets in the solid.

The prior art describes the use of micas and vermiculites for the growth of long MWCNTs. These are natural minerals composed of $SiO_2$—$Al_2O_3$ and other compounds such MgO, $Fe_2O_3$, $K_2O$, etc. These catalyst supports are typically subjected to exfoliation treatments at high temperatures prior to use. The efficiency of the exfoliation depends on the amount of steam generated between the lamellas and the pretreatment temperature that generally is higher than 800° C. Surface area, pore volume and the space between the lamellas increase significantly after the exfoliation process. Other aspects to consider include conditioning supports before their use, their type, level of impurities than can affect the zero point of charge, and surface properties of the support. Typical vermiculite chemical composition is: 14 wt % MgO, 44 wt % $Al_2O_3$, 12 wt % $SiO_2$, 13 wt % $Fe_2O_3$ and about 17 wt % $H_2O$ and other minor elements. The presence of iron oxides in vermiculite during the SWCNT synthesis using the Boudouard reaction ($2CO=C+CO_2$) enables the formation of carbon fibers and other types of carbon materials, contaminating the product. This represents a limitation for using this type of catalyst support for the synthesis of long and straight SWCNTs having narrow diameter size distribution for CNT membrane applications.

The prior art also describes removal of impurities contained in vermiculites (e.g., iron oxides) by leaching treatments in the presence of organic acid (citric, oxalic acids) and inorganic acid solutions (HCl, $HNO_3$, $H_2SO_4$ or combination of them) at different molar concentrations and temperatures. However, these treatments are not selective as they can also dissolve Al and Mg atoms from the vermiculite structure. A significant amount of iron always remains in the treated vermiculite which is not suitable for producing SWCNT or MWCNT for membrane manufacturing and other industrial applications.

SUMMARY

This disclosure is related to long CNTs having controlled diameter distribution and bundle size, and catalyst compositions and methods for the production of such long CNTs having controlled diameter distribution and bundle size. In some examples long SWCNT have a small tube or bundle diameter, such as CNT tubes or bundles with a length to diameter aspect ratio of greater than about 10,000. Unlike the conventional supported catalysts for the synthesis of carbon nanotubes, the present catalysts contain a relatively small amount of active metal (e.g., Co or Ni) nanoparticles (e.g., 0.01-0.06 wt % of such nanoparticles) which are supported on metal oxide supports, such as silica, alumina, or magnesia surfaces, and combinations of these metal oxides supports. These active metal nanoparticles enable the growth of long, straight individual carbon nanotube bundles on the support surface. Various types of carbon nanotubes (single wall, double wall or multiple wall) can be obtained using different catalyst compositions, carbon sources (CO, $CH_4$, $C_2H_2$, $C_2H_4$, etc.), and synthesis temperatures in fluidized bed or rotary tube reactors. In some examples the catalyst includes less than 0.1 weight percent of both Co and Mo. In some examples the Co/Mo ratio in the catalyst is less than 1.

Another advantage offered by this disclosure is the high dispersion of carbon nanotubes in organic and aqueous solvents. This is mainly due to the morphological properties of the purified CNT material (such as the frayed fabric-like CNT bundles of this disclosure versus the carpet-like structure CNT bundles that are known in the art). Entanglement, agglomeration or bundling of CNTs are problems that lower the membrane efficiency for contaminants separation or adsorption and complicate the fabrication process.

Both the catalyst manufacture and processes for synthesis and purification of the CNTs are commercially scalable. This makes the CNT-based membrane manufacturing processes much more competitive in cost than conventional organic membrane technologies.

In an example the catalyst preparation includes the following consecutive steps: a) contact an aqueous solution containing metallic salts of the active component(s) and colloidal particles of silica or alumina with a support based on silica, alumina, magnesium oxide, titania or a mixture of these oxides, using conventional impregnation techniques (e.g., pore volume, ionic exchange, mixing in a high-speed mixer), b) form a paste or granules of the impregnated material and age it under controlled humidity and temperature for about 2 hrs., c) dry the impregnated material in the presence of air-flow at temperature between 25° C. and 150° C., d) sieve the material to a particle size between 30 to 300 microns, depending on the type of reactor to be used, and e) calcine the catalyst powder in an oven in the presence of nitrogen or air plus nitrogen flow at a temperature between 400° C. and 600° C. In some examples the number and density of active metals are tuned in order to control the CNT growth and avoid the formation of a dense carpet of CNTs on the metal oxide surface, which happens when depositing high content of the active metals (≥0.2 wt %) on the substrate surface. Through the present technique a mesh of long-SWCNT (CNT length≥10 µm) frayed fabric-like CNT bundles covering the external surface of the support particles is formed.

When a method of catalyst preparation by ionic exchange is employed, in some examples an excess of metallic solution (about 3 to 6 times greater than the porous volume of the catalyst support) is contacted with the support in a closed vessel provided with a reflux system. The ionic exchange is carried out at 45-75° C. temperature range for several hours (e.g., two or more hours). The liquid is separated from the solid by filtration technique. The formed paste is dried and subsequently sieved and calcined according to the protocol described above.

In some examples of the present disclosure, iron impurities contained in the vermiculite are efficiently removed and at the same time the sheets are exfoliated by contacting the solid with chlorine gas diluted in $N_2$ at high temperature. The solid structure remains intact after the treatment.

All examples and features mentioned below can be combined in any technically possible way.

In one aspect, a bundle of carbon nanotubes (CNT) includes a plurality of CNT with lengths of at least about 7 microns, wherein the bundle has a diameter of less than about 12 nm.

Some examples include one of the above and/or below features, or any combination thereof. In an example at least some of the CNT are relatively straight. In an example at least some of the CNT are single-wall CNT (SWCNT). In an example at least some of the CNT have a diameter of less than 1 nm. In an example at least about 90% of the CNT have a diameter of less than 1 nm. In an example the CNT bundle has a length to diameter (L/D) aspect ratio of at least about 1,000. In an example the CNT purity is at least about 95%.

Some examples include one of the above and/or below features, or any combination thereof. In an example the plurality of CNTs are grown on metallic catalyst nanoclusters. In an example at least some of the metallic catalyst nanoclusters comprise one or more of cobalt, molybdenum, and nickel. In an example the catalyst comprises about the same weight percent of cobalt and molybdenum. In an example the catalyst comprises a molybdenum to cobalt weight ratio of less than 1. In an example the catalyst comprises about 0.1 weight percent cobalt and a molybdenum to cobalt weight ratio of about 0.5. In an example at least some of the metallic catalyst nanoclusters have a size in the range of from about 0.6 nm to about 1.0 nm.

In another aspect a catalytic composition for the synthesis of carbon nanotubes (CNT) includes an active catalyst metal content of less than 0.2 wt %.

Some examples include one of the above and/or below features, or any combination thereof. In an example the catalytic composition includes metallic catalyst nanoclusters. In an example at least some of the metallic catalyst nanoclusters comprise one or more of cobalt, molybdenum, and nickel. In an example the catalyst comprises about the same weight percent of cobalt and molybdenum. In an example at least some of the metallic catalyst nanoclusters have a size in the range of from about 0.6 nm to about 1.0 nm. In an example the active metal catalyst is at least in part supported on a metal oxide support surface. In an example the metal oxide support surface comprises silica. In an example the silica comprises colloidal silica particles.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures:

FIGS. 5A-5C are SEMs of SWCNTs of the present disclosure.

FIGS. 6A and 6B are SEMs of SWCNTs of the present disclosure.

FIGS. 7A and 7B are SEMs of SWCNTs of the present disclosure.

FIG. 16 is a bar chart of the diameter distribution of exemplary SWCNTs of the present disclosure determined by fluorescence analysis.

FIGS. 17A-17C are SEMs of SWCNTs of the present disclosure.

DETAILED DESCRIPTION

Figure 1A:
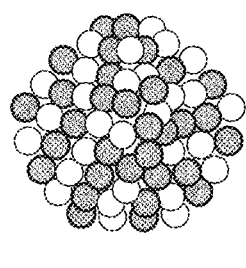
FIG. 1A is a simplified representation of a metallic cobalt nanocluster (having approximately 0.6-0.9 nm primary particles sizes)

Examples of the compositions, materials, systems, methods and apparatuses discussed herein are not limited in application to the details of construction and the arrangement of components set forth in the following description or illustrated in the accompanying drawings. The compositions, materials, systems, methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

Also, the phraseology and terminology used herein is for the purpose of description and should not be regarded as limiting. Any references to examples, components, elements, acts, or functions of the products, systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

This disclosure in part addresses and solves limitations regarding the preparation of $CoMo/SiO_2$ catalysts. As discussed above, the fine control in the formation and sizes of highly dispersed nanoparticles of the active metals deposited on the catalyst support surface affect the production of long and straight CNTs. For this purpose, very low metal content (for example, less than 1000 ppm or 0.1 weight percent) together with colloidal silica particles (e.g., Sigma Aldrich Ludox SM-30, 30% suspension in water) are used in the impregnating solution of some examples. Since the metal particles are distributed homogeneously and separated from each other on the surface, as evidenced by Scanning Electron Microscopy (SEM) images, the growth of carbon nanotubes is carried out with decreased steric hindrances and heat and mass transfer limitations. The carbon nanotube growth occurs on the surface of each individual metal particle in a straight form with a mesh-type morphology that covers the surface of the support particles. Although the metal content in the catalyst of the present disclosure is lower than that of the prior art (the prior art disclosing greater than 0.1 wt % Co), nevertheless the carbon yield is comparable (2-5 wt % carbon) since the SWCNTs are in some examples at least approximately 3 to 6 times longer.

In some examples the purification of carbon nanotubes is carried out by digestion of the catalyst particles in the presence of inorganic acids. In the case of $SiO_2$, concentrated HF solutions can be used. Since the metal content is lower in the present catalyst, and the carbon yield is comparable to that of the prior art, lower HF solution concentration is required to efficiently remove catalyst impurities from the product. Another aspect is the fact that the purified long SWCNT product has a different morphology from that of the prior art. This consists of the formation of a "frayed fabric" of SWCNTs, where bundles of CNT stick together in an aligned manner, as might fibers of a frayed fabric. The bundles are easily separated and dispersed in the presence of solutions containing surfactants. Less energy is needed to disperse the carbon nanotubes, which represents a great advantage in the manufacturing of CNT for both membranes and conductive film applications, and other applications that benefit from dispersed, long, narrow SWCNT.

In some examples this disclosure includes a novel heterogeneous catalyst for the production of long, straight carbon nanotubes having controlled diameter distribution. In some examples the CNT are produced in fluidized bed or rotary tube reactors. In some examples the CNT are used for the manufacture of membranes employed in different industrial applications. These applications include but are not limited to: seawater desalination, removal of organic and inorganic water contaminants (heavy metals, organic and inorganic substances), removal of microorganisms (bacteria, viruses and protozoa), personal protection equipment against chemical and biological substances, and air purification systems.

Multiple methods are used for the fabrication of SWCNTs, each providing SWCNTs with characteristic structures and compositions. For commercial SWCNT production, arc discharge, laser ablation, and two types of catalytic chemical vapor deposition (CCVD) are the main processes that have been used. Arc discharge and laser ablation were the first methods employed to synthesize SWCNTs on the scale of some tens of grams. Both of these methods involve evaporation of solid carbon in the presence of a mixed transition-metal catalyst, such as nickel/cobalt, followed by condensation of gaseous carbon atoms into a soot-like material that, in addition to CNTs, contains other forms of amorphous and graphitic carbon. These methods generally yield materials with diameters in the range of 1.3-1.8 nm. The purity of the SWCNTs from the reactor is typically less than 35%, and extensive purification is required to isolate the SWCNTs. Final yields of the purified CNTs can be as low as 10 wt % of the carbonaceous material produced. The high reaction temperature used is believed to produce SWCNTs with low defect concentrations compared with most other methods. However, the high cost of isolating the SWCNTs to obtain pure material suitable for membrane fabrication renders these methods very expensive. Furthermore, these methods have not demonstrated the capability of controlling SWCNT length, chirality, and diameter distribution that are useful for CNT-membrane fabrication and other commercial applications.

The CCVD method involves the decomposition of a carbon feedstock catalyzed at the surface of metallic nanoparticles, which also act as nucleation sites for the growth of carbon nanotubes. CCVD is versatile in the sense that it offers the ability to utilize a number of different carbon sources (carbon monoxide, hydrocarbons, alcohols, aromatics, etc.) with varying catalyst formulations and reactor designs, as well as wide-ranging temperatures and pressures. The three most popular CCVD processes used today are:

1. The lithography method that consists of depositing catalytic metals on a flat substrate (for instance silicon wafers) and then growth of the CNTs in a horizontal reactor in the presence of a carbon source at high temperature. By this method, forests of long-SWCNTs having broad diameter and chirality distribution are obtained. In spite of the high purity of the obtained material after harvesting the CNTs from the flat substrate, this method has technical and economical limitations for commercial production of CNTs.

2. The floating-catalyst method, which utilizes a gaseous unsupported catalyst, typically involves the decomposition of organometallic precursors (iron pentacarbonyl, ferrocene, etc.) at high temperatures to generate metallic nanoparticles in-situ. In the case of the high-pressure carbon monoxide (HiPco) process, CO serves as the carbon source and the SWCNT synthesis takes place at temperatures between 800° C. and 1200° C. and pressures of up to 50 atmospheres that make the HiPco process difficult to scale. The production of SWCNTs using the floating-catalyst method has been scaled to kilograms per day. However, control of diameter and chirality is extremely difficult with the floating-catalyst method because of the inability to control metal particle sizes precisely at the nanoscale prior to SWCNT nucleation and growth. SWCNTs synthesized from floating catalysts also tend to include large amounts of other forms of carbon, because the growth mechanism requires rigorous control of carbon segregation or diffusion on the metal nanoparticle surface. When carbon surface diffusion occurs, the catalyst particles become encapsulated by nontubular carbon. Thus, even though the floating-catalyst synthesis method is more scalable than the laser and arc-discharge methods, it still has the limitations of no controlled chirality, diameter, length and low relative purity (below 50%). The need for extensive purification and non-scalable chiral separation methods to meet quality requirements make the floating-catalyst method very expensive for CNT-membrane fabrication and other applications of SWCNTs.

3. The supported-catalyst CCVD combined with fluidized-bed reactor technology, has enabled SWCNTs to be made at a commercial scale with high purity, diameter and chirality control (CoMoCAT process). This process utilizes catalysts based on cobalt and molybdenum supported on silica particles for making high quality SWCNT from the Boudouard reaction. Fluidized bed reactors enable precise control of temperature and gas composition throughout the entire reaction zone. The combination of precise control of catalyst sites and reactor conditions enables the production of SWCNTs having smaller diameter distributions. The oxide precursor catalyst is submitted to an activation process by contacting the solid particles with a $H_2$ flow at high temperature before the SWCNT synthesis. A limitation of supported-catalyst CCVD is that the catalyst support represents a high percentage of mass of the as-produced SWCNT products but there are practical limits to the efficiency of digesting the supported catalyst. Rotary tube reactors have enabled the production in continuous operation mode of high quality MWCNT at commercial scale with high carbon yield (>85% carbon CNT yield). However, a more homogeneous product is obtained when using a fluidized bed reactor because of the uniform heat and mass transfer resulting from fluidization of the catalyst particles.

Fluidized bed and rotary tube reactors offer significant advantages for controlling the diameter and chirality distribution of SWCNTs compared to other synthesis methods described above. Under optimal gas-solid contact conditions the catalyst controls the process performance (carbon yield and selectivity to tubular carbon) and the morphology (length and diameter of the individual SWCNT and bundle sizes), structural (defects of the CNTs) and chirality (semi-conducting, semi-metallic and metallic) properties of the material.

Figure 1B:
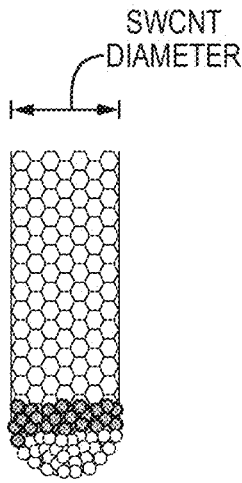
FIG. 1B is a simplified representation of SWCNT growth on the nanocluster of FIG. 1A.
Figure 1C:
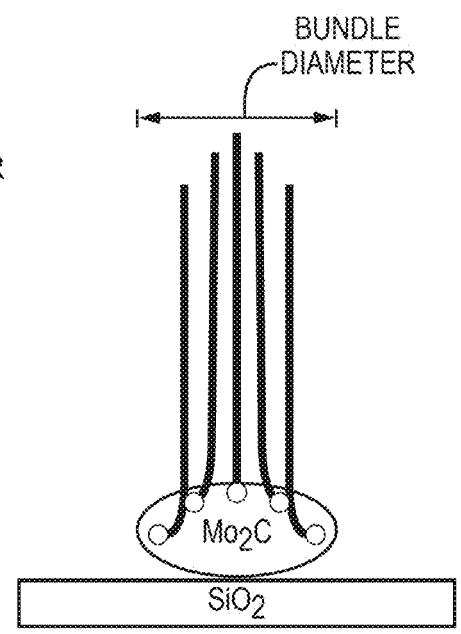
FIG. 1C is a simplified representation of SWCNT bundle formation on a $CoMo/SiO_2$ catalyst.

FIG. 1A is a simplified representation of a metallic cobalt nanocluster (having approximately 0.6-0.9 nm primary particles sizes). FIG. 1B is a simplified schematic representation of the SWCNT growth using this metallic cobalt nanocluster. FIG. 1C is a simplified schematic representation of SWCNT bundle formation on a $CoMo/SiO_2$ catalyst. The role of $Mo_2C/SiO_2$ is to support the metallic cobalt nanoclusters. The size of the active metal nanoclusters determines the diameter of the SWCNT whereas the bundle diameter is related to the diameter of and quantity of the SWCNT in the bundle.

The technical requirements for the manufacture of CNT-based membranes include relatively uniform CNT diameter, few individual CNT per bundle (smaller bundle diameter), long and straight CNTs, and fewer structural defects (i.e., high purity SWCNTs). The catalysts used in the prior art do not produce SWCNTs that meet these technical requirements, for example in the manufacture of seawater desalination membranes. Despite the fact that the CoMoCAT process can produce SWCNT with uniform diameter distribution, few structural defects and high purity in tubular carbon and residual catalyst, the tubes are shorter (<5 microns) and entangled and the bundle diameter is large (>10 nm) as compared to what is most needed for a desalination membrane. This requires the use of high energy and effective surfactants agents to disperse and de-bundle the tubes during the membrane fabrication. These problems are mainly due to the high concentration of active metals deposited on the support surface, which allows the formation of coarse active metal clusters. Consequently, the SWCNT bundles are shorter and larger in diameter (higher number of individual SWCNT per bundle) due to hindering effects that affect the kinetics of CNT growth.

Solutions to these technical issues involve one or more of: decreasing the size of the $Mo_2C$ nanoparticles, decreasing the number of active metals nanoclusters, increasing the surface dispersion of the nanoclusters, and controlling the number of SWCNT per bundle. In this manner, the reaction becomes more efficient for producing long SWCNT having smaller bundle sizes.

There are different technical pathways that can be adopted to achieve these solutions, for instance: the use of diluted cobalt and molybdenum solution concentration (to result in less than 0.1 weight % of both Co and Mo in the catalyst), and Mo/Co atomic ratio in the catalyst of less than 1.0, and the use of colloidal silica together with diluted cobalt and molybdenum solution concentration for modifying the surface properties of the silica and controlling the metal deposition during the impregnation and drying steps.

Figure 2A:
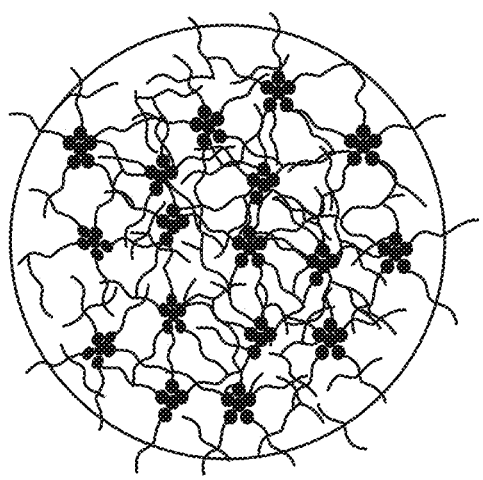
FIG. 2A schematically illustrates SWCNT growth when the catalyst contains high Co and Mo content and Mo/Co ratio greater than 1.0 of the prior art, and FIG. 2B schematically illustrates SWCNT growth of an example of the present disclosure wherein the catalyst is prepared using diluted metal solution concentration and Mo/Co atomic ratio of less than 1.0.
Figure 2B:
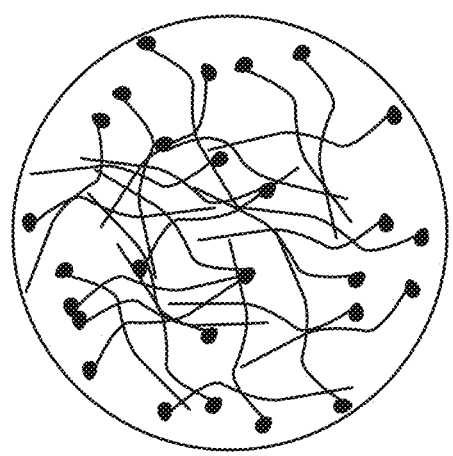

FIG. 2A schematically illustrates the SWCNT growth when the catalyst contains high Co and Mo content (Co greater than 0.3% and Mo greater than 0.5%) and Mo/Co ratio greater than 1.0 according to the prior art. FIG. 2B schematically illustrates the SWCNT growth when the catalyst is prepared according to this disclosure using diluted metal solution concentration such that both Co and Mo are present at less than 0.1% and Mo/Co atomic ratio less than 1.0. As can be seen, in the prior art a dense carpet having short entangled SWCNTs was formed on the support surface. Because a very low active metal concentration and a lower Mo/Co atomic ratio (e.g., 0.5-1.0) was used in the catalyst preparation in examples of the present disclosure, long (e.g., ≥7 microns) and straight SWCNTs having smaller bundles diameter (e.g., <12 nm) were obtained.

In addition to catalysts comprising Co and Mo supported on $SiO_2$ or MgO, in some examples other transition metals can be used, such as Ni, Cu, Ru, W and combinations of them, for the synthesis of long and straight SWCNTs. In examples herein the carbon source(s) for SWCNT synthesis includes one or more of carbon monoxide, methane, alcohol, etc. The diameter distribution of the carbon nanotubes is controlled by the type of metal of the catalyst support, the metallic composition of the catalyst, the type of reaction (e.g., $2CO=C+CO_2$, $CH_4 \rightarrow C+2H_2$) and the reaction temperature. In some examples both $SiO_2$ support particles and metallic impurities are removed from CNTs by digestion in the presence of a HF solution. In some examples the purity of the purified product is greater than 98 wt % which is suitable for its use in at least the manufacture of CNT-membranes and transparent conductive film applications.

With regard to the use of laminar solids for long and straight CNT synthesis, when used the material in some examples is submitted to a grinding process and then sieved to a particle sizes between 50 and 500 microns, preferably between 70 and 300 microns. It is subsequently treated in the presence of a flow of chlorine gas diluted in an inert gas (e.g., $N_2$, Ar) at high-temperature (>700° C.) to remove the iron oxide impurities. The material is then contacted in the presence of a metal solution containing a combination of nickel, cobalt and iron salts in the $Ni_xCo_yFe_2$ atomic composition (where; x+y=1) at temperatures between 50-80° C., preferably between 55-70° C. in a closed container equipped with a condenser, and then the system remains for about 3 hrs. under continuous agitation to promote ionic exchange. The metal exchanged solid particles are separated by filtration, dried under controlled conditions (room temperature for 2 hrs., 60° C. for 2 hrs. and 120° C. for 2 hrs.) and finally calcined in airflow at 500° C. for 4 hrs.

Long MWCNT synthesis over metal/vermiculite catalyst was carried out in a fluidized bed or rotary tube reactor in the presence $C_2H_4$, $H_2$ and inert gas flow, at atmospheric pressure at temperatures ranging between about 650 and about 750° C., preferably between 675-720° C. Product purification is accomplished using different acid treatments, such as a first digestion in the presence of $HCl+H_2SO_4$ acid solution to remove $Al_2O_3$, MgO and residual metals, and a second digestion in the presence of HF to dissolve $SiO_2$ particles.

Examples that illustrate the prior art and aspects of the present disclosure follow:

Example 1: Synthesis of SWCNT on $CoMo/SiO_2$ Catalyst from Prior Art

A catalyst was prepared by an incipient impregnation method of silica support with a solution containing cobalt nitrate and ammonium hepta-molybdate. The impregnated material was aged at room temperature for 3 hrs. under controlled moisture and then dried at 120° C. for 3 hrs. and calcined at 450° C. for 4 hrs. The cobalt content in the catalyst was 0.6 wt % and the Mo/Co molar ratio was 2.0. The synthesis of SWCNTs was carried out by using CO as a carbon source in a fluidized bed reactor which was operated at a temperature of 760° C., 40 psig and 50 min. reaction time. The metal oxide precursor catalyst was activated by reduction in the presence of $H_2$ at 680° C. temperature before the SWCNT synthesis.

Figure 3A:
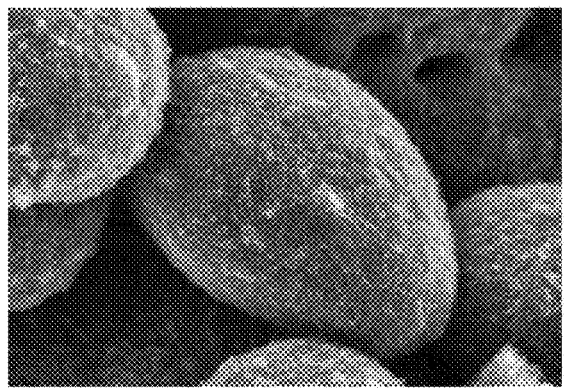
FIGS. 3A and 3B are scanning electron micrographs (SEMs) of prior art SWCNTs.
Figure 3B:
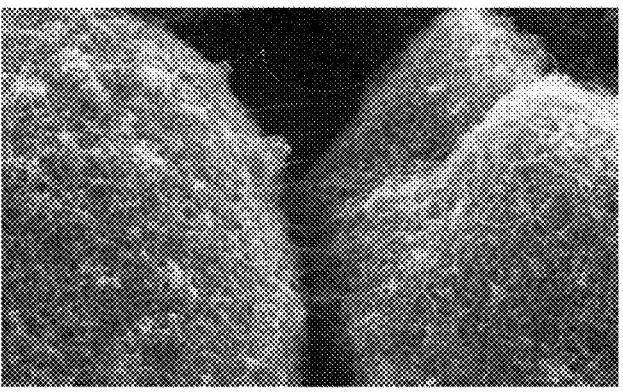
Figure 4A:
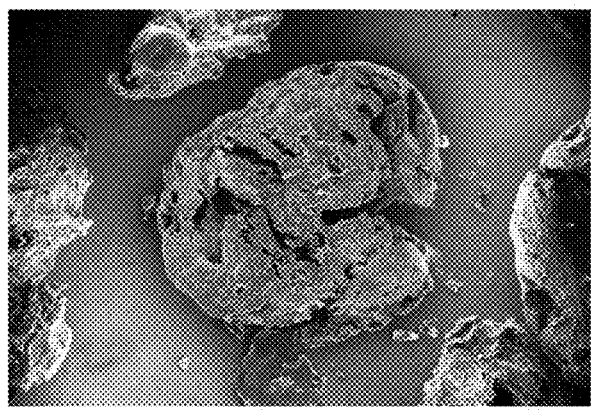
FIGS. 4A-4D are SEMs of prior art SWCNTs.
Figure 4B:
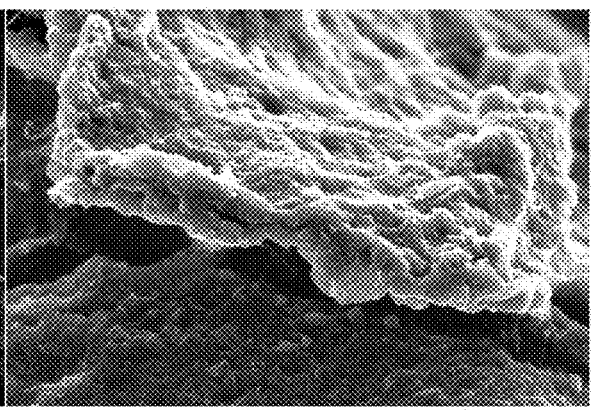
Figure 4C:
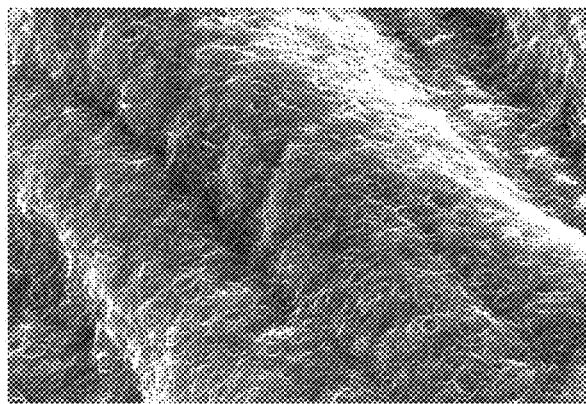
Figure 4D:
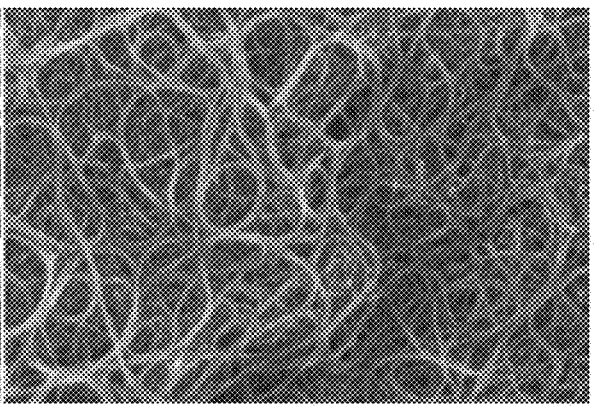

FIGS. 3A and 3B show SEM images (at 12KX and 25KX respectively) corresponding to as produced SWCNTs synthesized using this $CoMo/SiO_2$ catalyst, and FIGS. 4A, 4B, 4C and 4D show SEMs taken at different magnification (30×, 10KX, 25KX and 100KX respectively) of the obtained and purified SWCNTs. A dense carpet of about 0.7 to 1.2 microns thickness containing short and entangled SWCNTs (≤3 microns length) can be observed. Due to the high degree of entanglement of carbon tubes, the material has low dispersibility in aqueous solution dispersions containing surfactant agents, or dispersed using organic solvents.

Example 2: Synthesis of Long Tubes Using Low Metal Solution Concentration Together with Colloidal Silica in the Catalyst Preparation A second catalyst was prepared according to one aspect of the present disclosure by impregnating the silica catalyst support substrate with an aqueous solution containing cobalt and molybdenum salts and a colloidal silica (10 wt % of $SiO_2$ in the solution). In this case, the Co content in the catalyst was about 0.1 wt % and the Mo/Co atomic ratio was 0.5. Aging, drying, calcination steps and SWCNTs synthesis were conducted under the same conditions as those described in Example 1.

FIGS. 5A, 5B and 5C show SEM images taken at different magnification (25KX, 50KX, 75KX respectively) of the as produced SWCNTs synthesized using this catalyst. As can be observed, a mesh of SWCNT is formed on both silica nano-particles coming from the colloidal silica additive and the silica support. This mesh is formed from individual long SWCNT bundles having length between 5 to 7 microns. In contrast with the prior art, the purified SWCNTs of the present invention are easier to disperse in organic as well as in aqueous surfactant solutions, even at lower sonication power and time.

To demonstrate the effect of adding colloidal particles together with the metallic salts in the impregnating solution to control the SWCNTs growth, a third catalyst was prepared following the same procedure, but instead using graphite as a catalyst support. SWCNT synthesis was carried out in a rotary tube reactor at the same reduction, reaction temperature and time employed in previous examples. The SEM images at different magnifications (50KX and 100KX) corresponding to the SWCNT-graphite product are shown in FIGS. 6A and 6B, respectively. These images clearly illustrate the formation of a mesh containing long and straight SWCNTs on the $SiO_2$ nanoparticles coming from the colloidal silica aggregates.

Figure 8:
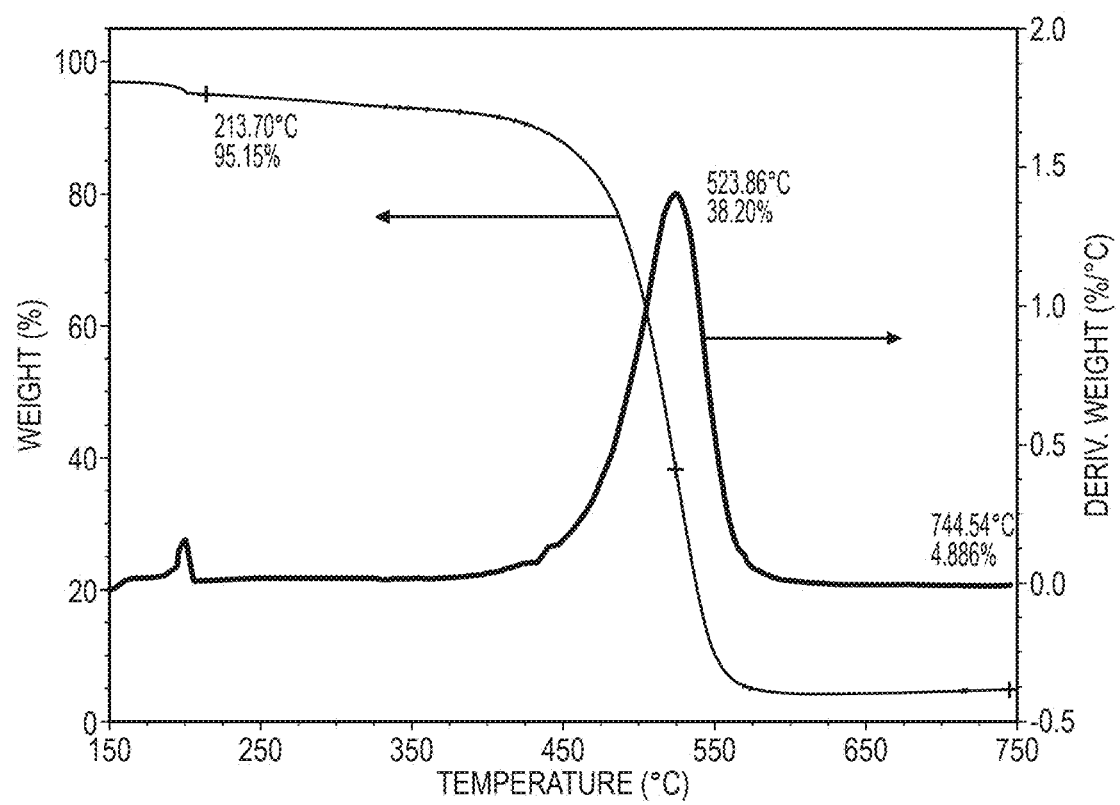
FIG. 8 is a Thermogravimetric Analysis (TGA) of a purified SWCNT sample of the present disclosure.

FIGS. 7A and 7B are SEM images (at 20KX and 15KX respectively) and FIG. 8 is a thermogravimetric analysis (TGA) corresponding to the purified sample illustrated in FIGS. 7A and 7B. In FIGS. 7A and 7B veils of long SWCNT bundles of about 8 microns in length can be observed. The TGA analysis shows a single signal whose maximum combustion carbon rate is about 524° C. that is typical for SWCNTs. No other types of carbon (amorphous or graphitic carbon) are observed. The SWCNT purity is about 95 wt %.

Example 3: Synthesis of Long Tubes Using Very Low Metal Solution Concentration and Mo/Co Atomic Ratio in the Catalyst Preparation A fourth catalyst was prepared by diluting the Co and Mo concentration in the impregnating solution employed in Example 2. In this case, the Co content in the finished catalyst was about 0.04 wt % (400 ppm Co) and the Mo/Co atomic ratio was 0.5. The SWCNT synthesis was performed at 760° C. in a fluidized bed reactor. The catalyst activation was carried out following the same protocol previously described.

Figures 9A, 9B:
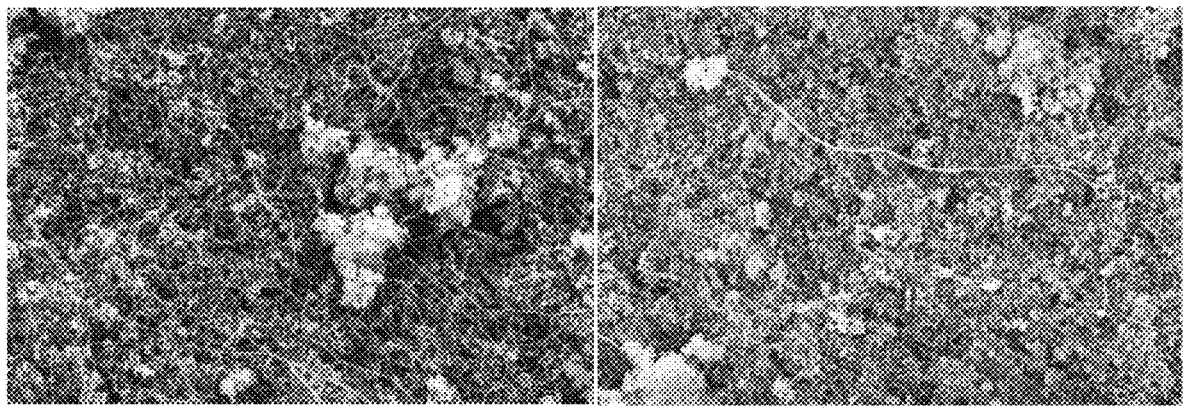
FIGS. 9A-9C are SEMs of SWCNTs of the present disclosure.
Figure 9C:
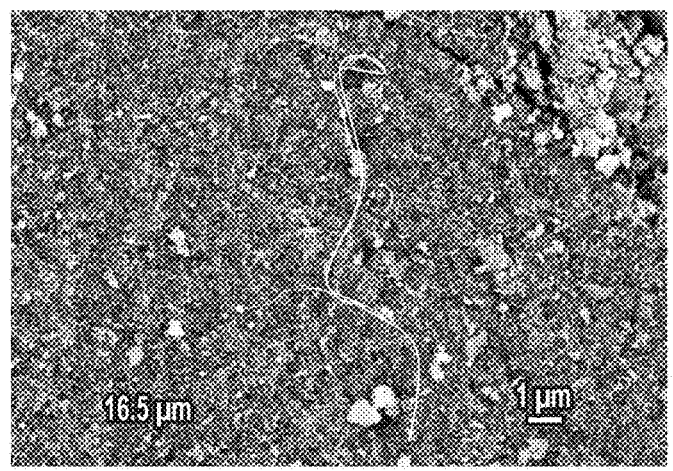

FIGS. 9A, 9B and 9C show SEM images taken at different magnifications (FIGS. 9A at 20KX, 9B at 15KX and 9C at 5KX) corresponding to the product obtained using the $CoMo/SiO_2$ catalyst preparation method of Example 3. FIG. 9A shows the formation of a mesh of straight SWCNTs bundles on the surface of the silica support. The SWCNT bundles diameter varies between 3 and 12 nm, most of them between 5 to 8 nm, and the length between 8 and 16 microns (FIGS. 9B and 9C).

Figure 10:
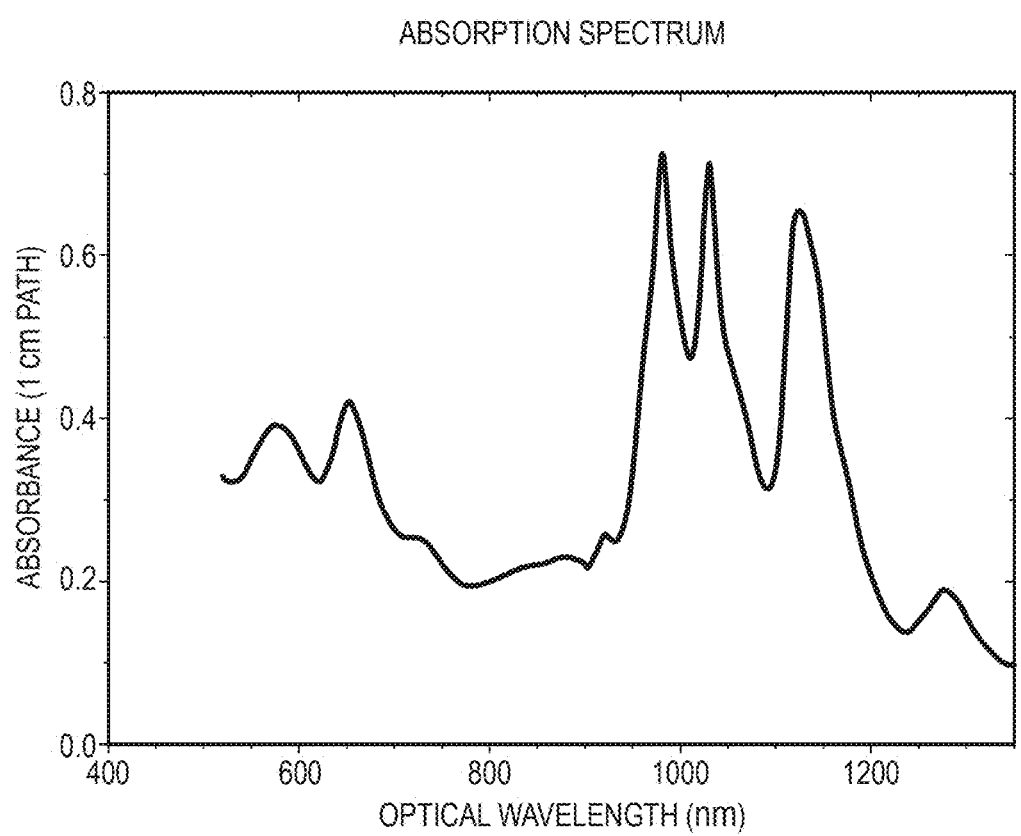
FIG. 10 is a graph of the optical absorption spectra of exemplary SWCNTs of the present disclosure.

SWCNTs can be distinguished from other types of CNTs by their light absorption capacity. FIG. 10 shows the absorption spectra corresponding to the SWCNTs synthesized at 760° C. by using the catalyst preparation method in Example 3. The signals appearing at frequencies between 800 and 1300 nm are characteristic SWCNT semiconductors (region S11) of the absorption whereas, signals between 500 and 800 nm correspond to the regions S22 and M11, where "M" stands for metallic SWCNTs that absorbs at frequencies between 400 and 600 nm. In the S11 region, four main signals at 976 nm, 1,024 nm, 1120 nm and 1,265 nm correspond to the chirality (6,5), (7,5), (7,6) and (8,7), respectively.

Figure 11:
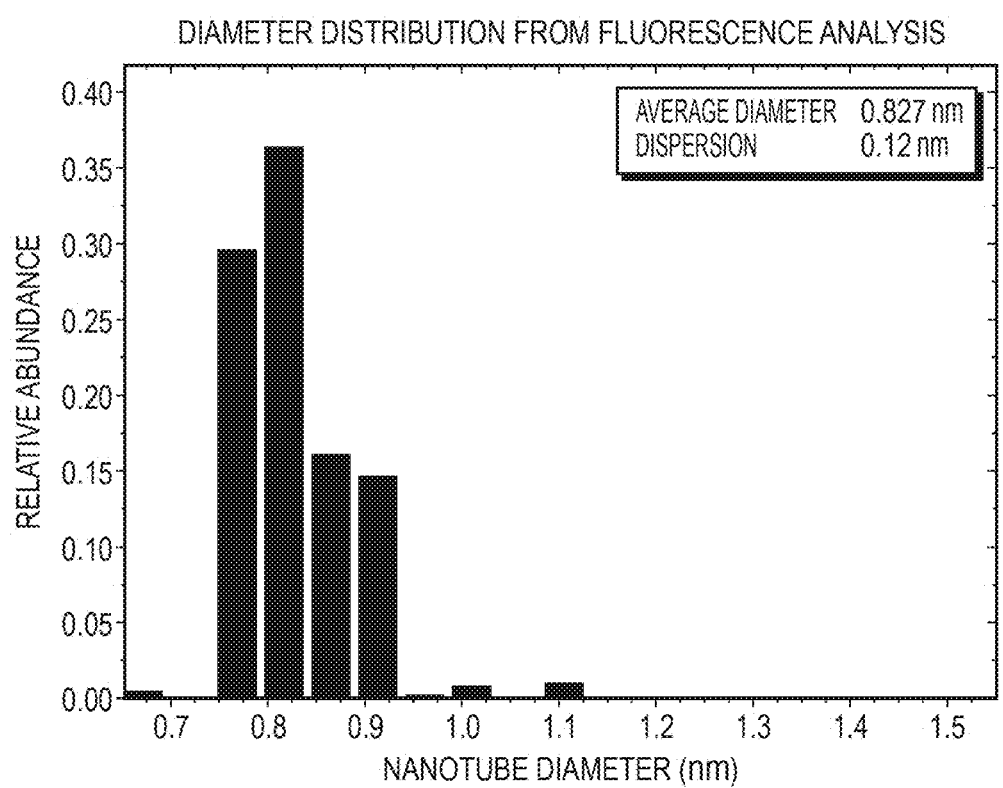
FIG. 11 is a bar chart of the diameter distribution of exemplary SWCNTs of the present disclosure determined by fluorescence analysis.

The semiconductor SWCNTs unlike the metallic ones, show fluorescence properties in the near infrared region (NIRF). Through this spectroscopic technique of analysis, information about the chirality and diameter distribution can be obtained. The average diameter of the semiconductor tubes is obtained through the integration of the signals obtained by the different lasers. FIG. 11 shows the diameter distribution obtained from NIRF spectra corresponding to the SWCNTs synthesized at 760° C. by using the catalyst preparation method in Example 3. A narrow diameter distribution of the SWCNTs can be observed, more than 90% have a diameter between 0.75 and 0.92 nm. The average diameter for the sample is about 0.83 nm, which is suitable for the CNT-membrane fabrication.

Figure 12:
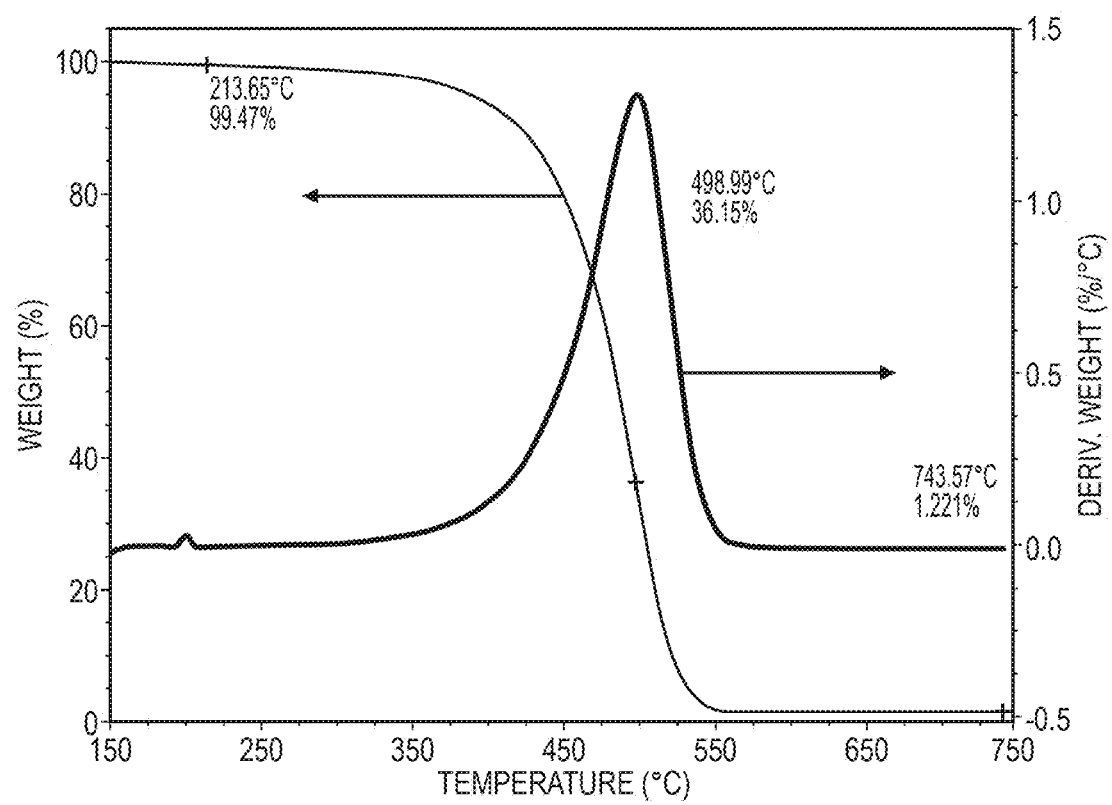
FIG. 12 is a TGA of another SWCNT sample of the present disclosure.

Thermogravimetric analysis (TGA) provides information on the thermal stability of CNTs, the presence of other types of carbon compounds, and the purity of the material. FIG. 12 shows TGA analysis corresponding to SWCNTs synthesized at 760° C. using the catalyst preparation method in Example 3. A single signal observed at around 500° C. corresponds to the combustion of SWCNT. The presence of other types of carbon compounds in the sample were not observed. The product after purification contains about 1.2 wt % of residual metals (Mo and Co carbides), which are insoluble in HF.

Figure 13A:
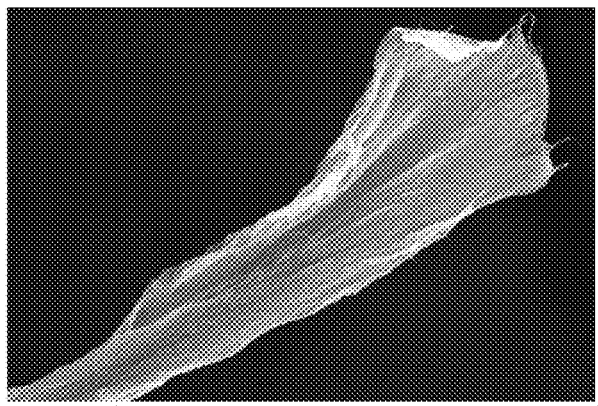
FIGS. 13A-13C are SEMs of SWCNTs of the present disclosure.
Figure 13B:
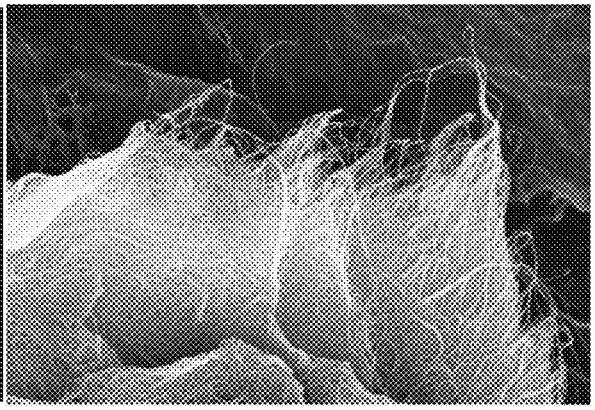
Figure 13C:
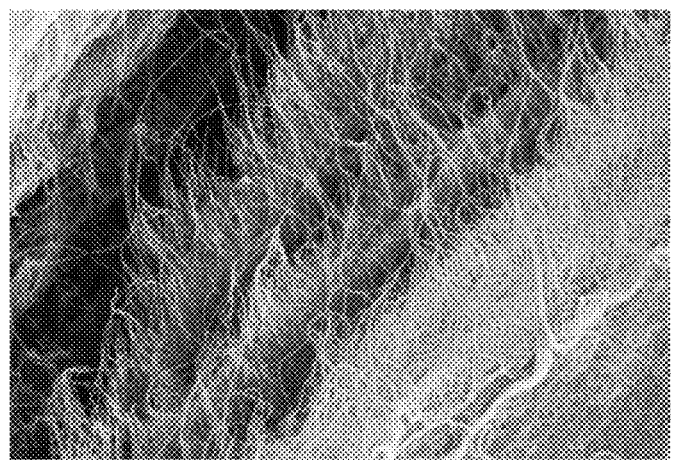

FIGS. 13A, 13B and 13C shows SEM images taken at different magnifications (FIG. 13A at 9KX, FIG. 13B at 30KX and FIG. 13C at 25KX) of the purified SWCNTs synthesized at 760° C. Straight and long SWCNTs bundles forming an aligned frayed fabric-like structure were observed. The obtained purified SWCNTs are easy to debundle, such as by dispersion in aqueous surfactant solutions and in organic solvents.

Example 4: Effect of the Synthesis Temperature on the Diameter Distribution and Morphology of the SWCNTs In this example, the SWCNT synthesis was performed at 690° C. in the presence of the catalyst prepared in Example 3. The catalyst activation was carried out following the same protocol previously described. The SWCNT synthesis was carried out in a fluidized bed reactor.

Figure 14:
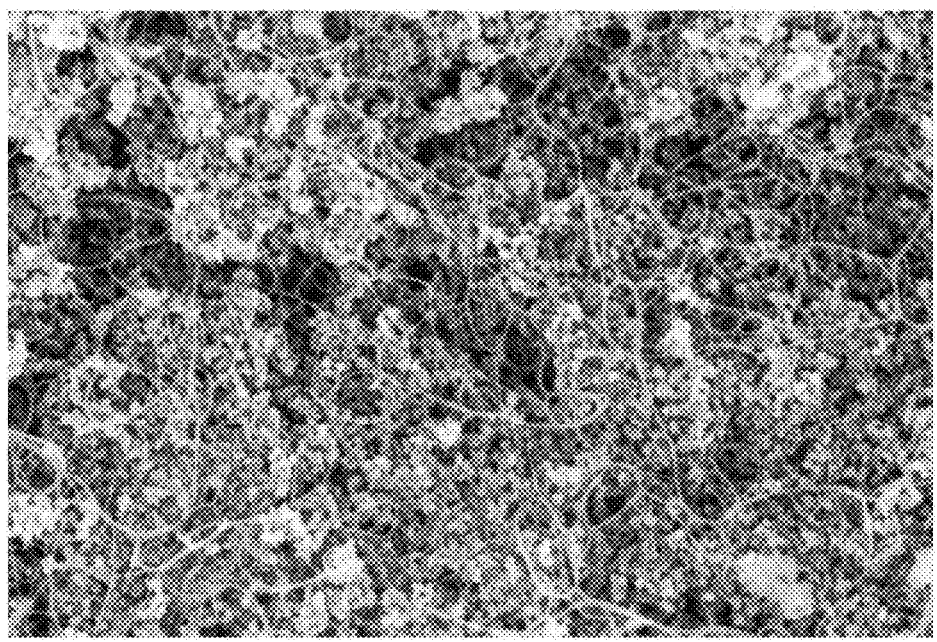
FIG. 14 is an SEM of SWCNTs of the present disclosure.

In FIG. 14, the image obtained by SEM (35KX) of the as produced SWCNTs synthesized at 690° C. shows the formation of a fine mesh of long SWCNT bundles of about 7 to 10 microns on the surface of the support.

Figure 15:
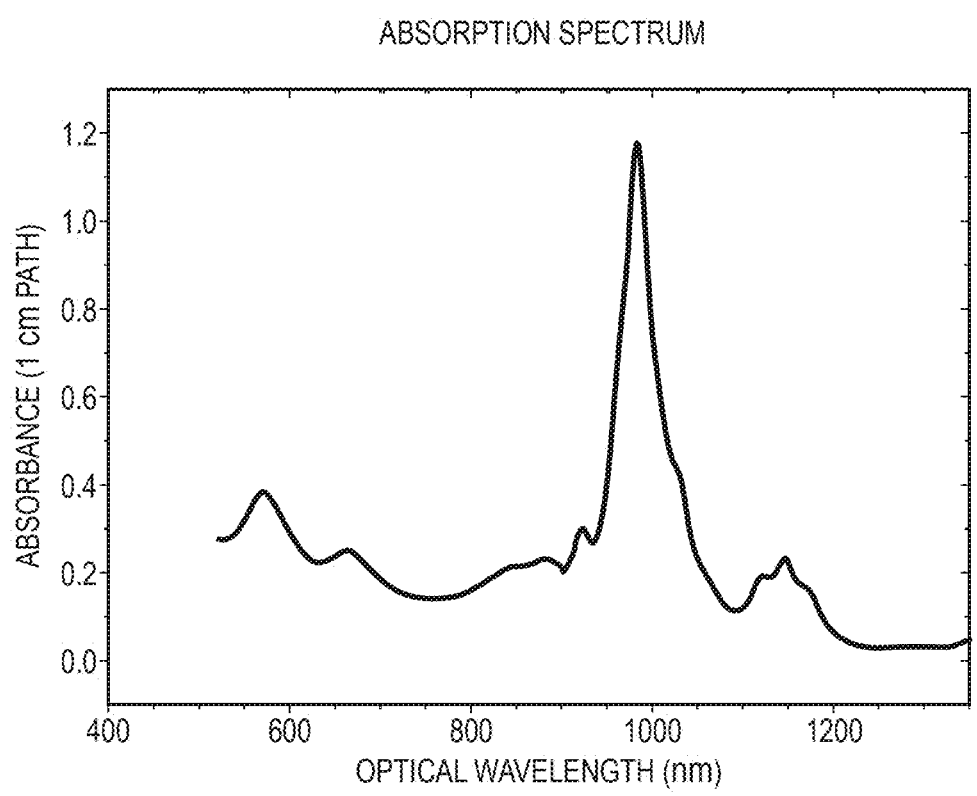
FIG. 15 is a graph of the optical absorption spectra of exemplary SWCNTs of the present disclosure.

The optical absorption spectra of the as produced SWCNT sample synthesized at 690° C. (FIG. 15) shows in the S11 region an intense signal located at around 976 nm which corresponds to the (6,5) chirality and three small absorption signals located between 110 and 1200 nm. These signals correspond to SWCNTs chiralities having diameters larger than 0.80 nm.

The analysis of the sample by NIRF shown in FIG. 16 indicates a significant decrease in the average diameter of the SWCNTs when the reaction was carried out at a lower temperature. In this case, the average diameter of the SWCNTs is approximately 0.77 nm with semiconducting composition>95%. The (6,5) composition in this sample was about 50% making this material suitable for transparent semi-conducting film applications.

Figure 17C:
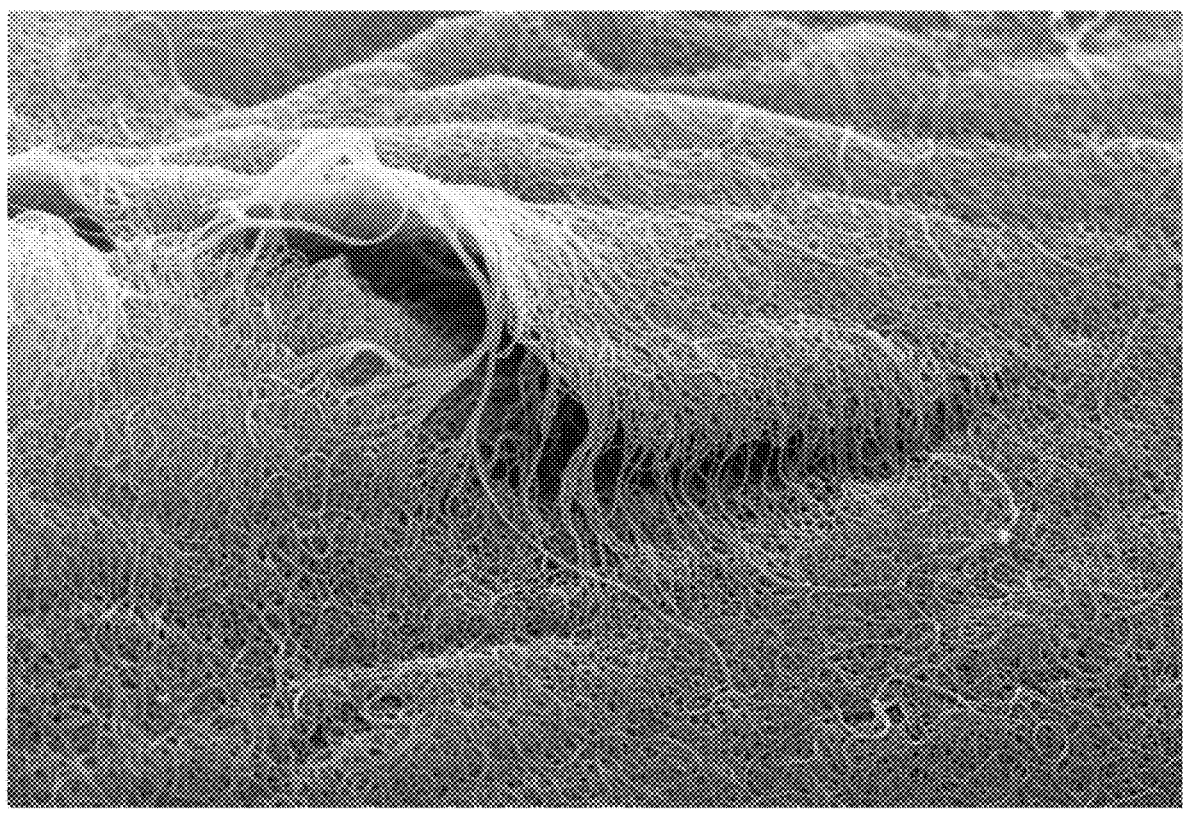

FIGS. 17A, 17B and 17C shows SEM images taken at different magnification (9KX, 25KX, and 25KX, respectively) of the purified SWCNT sample synthesized at 690°

C. by using the catalyst preparation method in Example 3. The images also show clear evidence of the formation of straight and long SWCNTs bundles forming a frayed fabric-like structure.

Example 5: Transparent Conductive Films Based on SWCNTs Applications

Transparent Conductive Films (TCFs) are used in a wide range of commercial applications, including information displays, capacitive touch sensors, solar photovoltaic modules, EMI shielding windows, and transparent heaters, etc. There are several materials that are transparent and others that are electrically conductive, but there are only few materials that are both. For flexible and transparent conductive films applications, polythiophene materials (PEDOT) are standard commercial conductive materials, but these suffer from environmental stability problems, especially during UV and high temperature/humidity aging tests. CNTs offer all the advantages of PEDOT without compromising environmental stability.

The transport model correlates the thin film conductivity (UDC) with the following: a) CNT aspect ratio (bundle length and diameter), b) the junction resistance between semiconducting and metallic SWCNTs and the c) network morphology of the film.

$$\sigma_{DC} = \frac{K}{\langle R_j \rangle} \frac{V_f^2}{\langle D \rangle^3}$$

Where:
K=Bundle length proportionality factor (~$L^{1.7}$).
$V_f$=Network morphology though film fill factor.
$R_j$=Mean junction resistance.
D=Bundle diameter.

According to this model, the thin film conductivity increases significantly when the bundle or individual CNTs aspect ratio (L/D) increases. The SWCNTs of present disclosure showed a bundle diameter of about 5-8 nm and a length of about 8-16 microns while the CNTs of the prior art showed a bundle diameter of about 8-15 nm and a length of about ≤3.0 microns. Since the present SWCNTs have a much greater aspect ratio the thin film conductivity is expected to increase.

Figure 18:
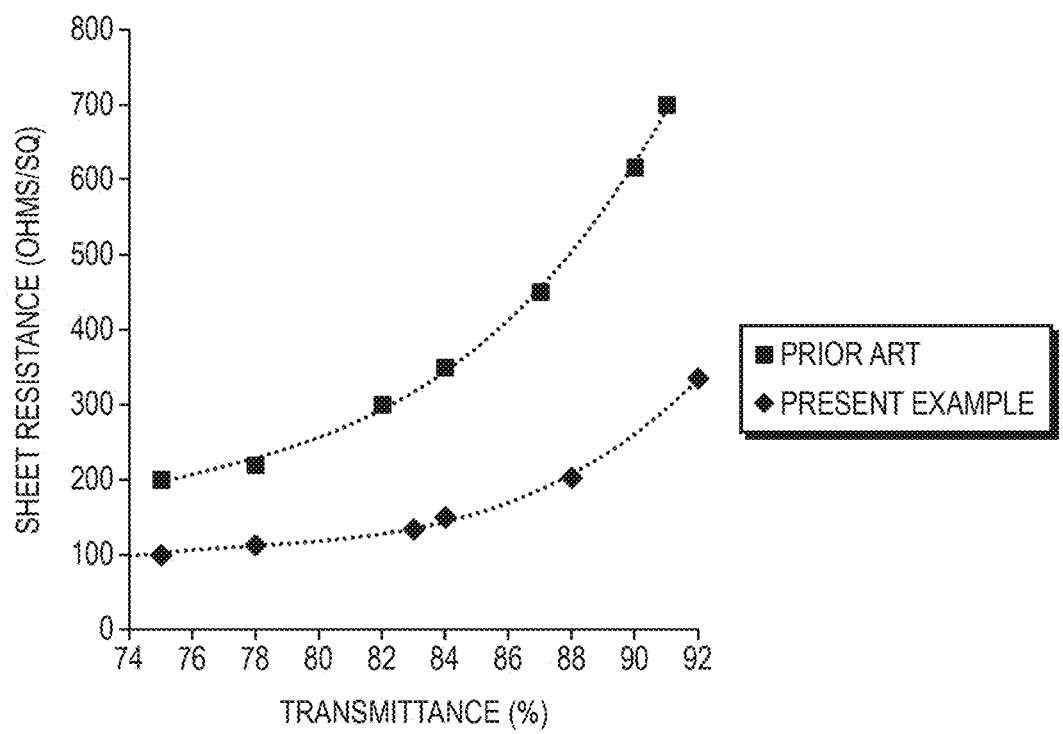
FIG. 18 is a comparison of the sheet resistance versus visible light transmittance for a transparent conductive film (TCF) using SWCNTs of the present disclosure versus SWCNTs of the prior art.

In this section, the performance of two SWCNTs synthesized according to prior art (Example 1) and the present invention (Example 3) are compared by their TCF properties. The carbon nanotubes were dispersed in an aqueous solution using a sonication technique with 2 wt % of an anionic surfactant (such as Dowfax anionic surfactant available from The Dow Chemical Company). After sonication and centrifugation, the SWCNT supernatant fraction was coated on a polyethylene substrate by using the drawdown technique. The sheet resistance was determined using a 4-point probe technique for various visible light transmittances (%). The results are shown in FIG. 18, including results at 85% T and 90% T. The SWCNTs synthesized according to the current disclosure are about 2.2 and 2.3 times, respectively more conductive than that of the prior art. Also, the SWCNTs were observed to disperse better than the prior art due to their morphology properties and high aspect ratio (see FIGS. 4 and 13).

Figure 19:
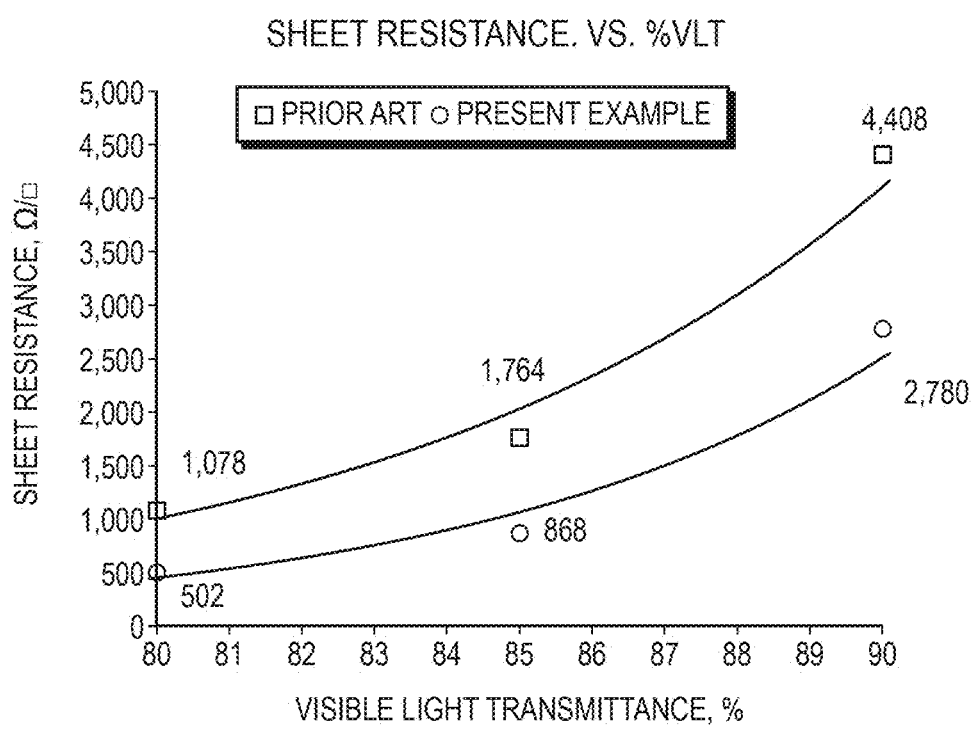
FIG. 19 is a comparison of the sheet resistance versus visible light transmittance for another TCF using SWCNTs of the present disclosure versus SWCNTs of the prior art.

Example 6: Conductivity Properties of Thin Film Produced with CNT-Organic Solvent In this example both CNTs synthesized by following the procedures in examples 1 and 3, were dispersed in isopropanol solution and then blended with an organic solvent vehicle consisting of a primary amine, a carbamate compound and isopropanol. The viscosity and density properties of the vehicle is suitable for producing transparent conductive films based on CNTs by using a printing technique. The procedure for preparing the organic vehicle was described in the prior art (e.g., U.S. Pat. No. 9,777,168). FIG. 19 compares the TCF properties of the SWCNTs synthesized according to the prior art and the present disclosure using organic solvent. In this case, the surface resistivities values are higher than those in which the CNTs are disbursed by aqueous dispersions containing surfactant agents. However, there are important differences in conductivity measurements at various % transmittance between these two materials. In this case, the SWCNT synthesized in the present disclosure has a conductivity that is about 2.0 and 1.6 times higher than the SWCNTs of the prior art at 85% and 90% transmittance, respectively.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A single wall carbon nanotubes (SWCNT) bundle, comprising:
    a catalyst construction, comprising:
        a metal oxide support;
        nanoclusters of active metal nanoparticles, wherein the active metal nanoparticles comprise at least one of cobalt, molybdenum, and nickel; and
        a group of SWCNT made up of a plurality of separate, closely-spaced SWCNT grown on the active metal nanoparticles,
    wherein most of the SWCNT have diameters of less than one nanometer, wherein a length of the bundle is at least 7 microns, and wherein the bundle has a diameter of less than 12 nm.

2. The SWCNT bundle of claim 1, wherein at least some of the SWCNT are straight.

3. The SWCNT bundle of claim 1, wherein at least about 90% of the SWCNT have a diameter of less than 1 nm.

4. The SWCNT bundle of claim 1, wherein the catalyst construction comprises about the same weight percent of cobalt and molybdenum.

5. The SWCNT bundle of claim 1, wherein the catalyst construction comprises a molybdenum to cobalt weight ratio of less than 1.

6. The SWCNT bundle of claim 1, wherein the catalyst construction comprises about 0.1 weight percent cobalt and a molybdenum to cobalt weight ratio of about 0.5.

7. The SWCNT bundle of claim 1, wherein at least some of the nanoclusters have a size in the range of from about 0.6 nm to about 1.0 nm.

8. The SWCNT bundle of claim 1 with a length to diameter (L/D) aspect ratio of at least about 1,000.

9. The SWCNT bundle of claim 1, wherein the SWCNT purity is at least about 95%.

10. The SWCNT bundle of claim 1, wherein the active metal makes up less than 0.2 wt % of the catalyst construction.

* * * * *